United States Patent
Castles

[11] Patent Number: 5,141,334
[45] Date of Patent: Aug. 25, 1992

[54] SUB-KELVIN RESISTANCE THERMOMETER

[75] Inventor: Stephen H. Castles, College Park, Md.

[73] Assignee: The United States of America as represented by the Administrator of the National Aeronautics and Space Administration, Washington, D.C.

[21] Appl. No.: 765,070

[22] Filed: Sep. 24, 1991

[51] Int. Cl.$^5$ .................... G01K 7/16; G01K 7/00
[52] U.S. Cl. .................... 374/178; 374/185; 357/28; 338/22 SD; 338/25
[58] Field of Search .............. 374/178, 185; 338/25, 338/22 SD; 357/28

[56] References Cited

U.S. PATENT DOCUMENTS

| | | | |
|---|---|---|---|
| 2,871,427 | 1/1959 | Tyler et al. | 317/239 |
| 3,566,690 | 3/1971 | Ebrahimi | 357/28 |
| 3,936,789 | 2/1976 | Matzen et al. | 357/28 |
| 4,047,436 | 9/1977 | Bernard et al. | 374/178 |
| 4,215,577 | 8/1980 | Griffing et al. | 374/178 |
| 4,288,775 | 9/1981 | Bennewitz et al. | 357/28 |
| 4,370,640 | 1/1983 | Dynes et al. | 338/25 |
| 4,744,246 | 5/1988 | Busta | 374/178 |
| 4,924,114 | 5/1990 | Ruhle | 374/185 |

FOREIGN PATENT DOCUMENTS

| | | | |
|---|---|---|---|
| 0193581 | 8/1988 | Japan | 338/25 |
| 0181456 | 7/1989 | Japan | 357/28 |
| 0114501 | 4/1990 | Japan | 338/22 SD |
| 0845020 | 7/1981 | U.S.S.R. | 374/178 |

OTHER PUBLICATIONS

McGraw-Hill Encyclopedia of Science & Technology, vol. 18, pp. 216–218, (1987).
McGraw-Hill Encyclopedia of Science & Technology, vol. 10, pp. 204–208, (1987).

Primary Examiner—William A. Cuchlinski, Jr.
Assistant Examiner—Diego F. F. Gutierrez
Attorney, Agent, or Firm—R. Dennis Marchant; Guy M. Miller; Paul S. Clohan, Jr.

[57] ABSTRACT

A device capable of accurate temperature measurement down to 0.01° K. of an object whose temperature is to be measured consisting of a heat sink wafer a first conducting pad bonded near one end of the heat sink wafer and a second conducting pad bonded near the other end of the heat sink wafer, an oblong doped semiconductor crystal such as germanium, the oblong doped semiconductor crystal has a third conducting pad bonded on its top surface and a fourth conducting pad bonded on its bottom surface with the oblong doped semiconductor crystal bonded to the heat sink wafer by having the fourth conducting pad bonded to the first conducting pad, a wire bonded between the second and third conducting pads, and current and voltage applying wires bonded to the first and second conducting pads whereby the change in resistance of the oblong doped semiconductor crystal indicates the temperature of an object whose temperature is to be measured.

12 Claims, 4 Drawing Sheets

SUB-KELVIN RESISTANCE THERMOMETER

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to measurements at very low temperatures and more particularly to a device capable of accurate temperature measurement down to 0.01° K.

BACKGROUND ART

Measurements at temperatures below 1° K. are special, not only because quantum phenomena are present on a macroscopic scale, but also because the small heat capacities of many systems studied preclude measurement techniques which gratuitously introduce energy and modify the state of the subject. In addition, relaxation times are long, and a system, once perturbed, may take minutes or even days to return to a state of equilibrium. Consequently, it is difficult to find an accurate, reproducible, and "well behaved" thermometer that is very sensitive, small, of low heat capacity that is not costly and complex. The magnitude of a temperature, or a temperature change, is significant only in relation to the quantity $E/k$, or $\Delta E/k$, where k is Boltzmann's constant, and E and $\Delta E$ are energies which characterize the phenomenon under investigation.

Below 1° K., the traditional method for measuring temperature has been that of magnetic thermometry. A sample is calibrated at a known temperature in the 1-4° K. region, and then, for lower temperature, a "magnetic temperature" $T^*$ is extracted from the inversion of Curie's law. The magnetic thermometer is still used because of its basic simplicity, and also as a verifier and "smoother" of temperature scales derived by other methods. Enhanced detection sensitivity is available through superconducting quantum interference device (SQUID) technology. Other methods include Gamma-ray anisotropy and thermal electric noise thermometry.

Because of their relative low cost, resistance thermometers tend to be accorded highest favor as far as practicality is concerned, but very few types having adequate sensitivity exist. Doped germanium semiconductors or germanium resistance thermometers (GRT's) and carbon resistors are much in use down to temperatures as low as a few millikelvins, the germanium being somewhat more reproducible but in the past much more costly.

Currently, the most commonly used temperature sensor in the range between 0.05° K. and 1° K. is the GRT. GRT's are commercially available from several vendors, such as Lake Shore Cryotronics, Scientific Instruments, Inc., and Cryocal Inc. The standard configuration is a relatively thin crystal of germanium enclosed in a gas filled capsule. These commercially available GRT's cannot be used accurately below approximately 0.05° K.

There are three major problems with the present GRT's in the 0.05° K. to 1° K. temperature range. The first problem is that the presently available GRT's depend on gas in the enclosing capsule to conduct the heat away from the germanium sensing element. Helium-4, which is the commonly provided gas, can be used down to about 0.85° K. while, at a significant cost, helium-3 can be used down to about 0.2° K. Below 0.2° K., no useful gas is available. The loss of thermal conduction through the gas decreases the electrical current that can be used to measure the resistance of the germanium crystal since the crystal will over-heat at a very low current level. As a result, the sensitivity of the temperature measurement decreases at lower temperatures.

The second problem with current GRT's is that the temperature sensitivity depends on the slope of the temperature (T) resistance (R) curve for the sensor. The lower temperature GRT's typically have small R vs. T slopes ($1/R \times dR/dt$).

The third problem with present day GRT's is that the electrical leads to the germanium crystals are attached to a small area of the crystal. This small contact area induces large electrical gradients in the germanium crystal that can degrade the performance of the temperature sensor.

STATEMENT OF THE INVENTION

It is therefore an object of the present invention to provide an improved low temperature thermometer with increased sensitivity at temperatures below 1° K.

Another object of the invention is to provide a low temperature thermometer having an improved area for mounting the electrical leads.

A further object is to provide a low temperature thermometer having improved thermal contact between the temperature sensor and the object whose temperature is to be measured.

A still further object of the invention is to minimize electrical field effects that degrade the temperature sensitivity in low temperature thermometers.

These and other objects are achieved by providing a bulk doped germanium crystal, having a total resistance between 100 Ohms and 100,000 Ohms in the temperature range of interest, i.e., between 0.01° K. and 1° K., used to sense the temperature of an object whose temperature is to be measured.

The germanium crystal is treated to provide large electrical pads on the top and bottom of the crystal. The top electrical pad is a gold pad sputtered on top of the germanium crystal and the bottom electrical pad is also a gold pad sputtered on the bottom of the germanium crystal. The top and bottom surfaces of the crystal may be "metalized" with an appropriate doping to ensure low noise electrical contact to the gold pads. The bottom electrical pad on the germanium crystal is also physically and electrically connected to an electrical pad on the top of a sapphire crystal wafer. The sapphire crystal wafer can then be bonded to a mounting plate made from copper for mounting on the object whose temperature is to be measured. Two electrical leads, a current lead and a voltage lead are bonded to and emanate from the wafer electrical pad, and are connected to external instruments in the normal manner to facilitate the measurement of current through and voltage across the germanium crystal. A second wafer electrical pad is provided at the opposite end of the sapphire crystal wafer for bonding a second pair of matching electrical leads, a current lead and a voltage lead. An additional electrical lead is bonded to the second wafer pad and to the top electrical pad and completes the connection between the two wafer pads. The two wafer electrical pads are bonded to the sapphire crystal wafer in a standard manner as are the electrical leads.

DETAILED DESCRIPTION OF THE INVENTION

Figure 1:
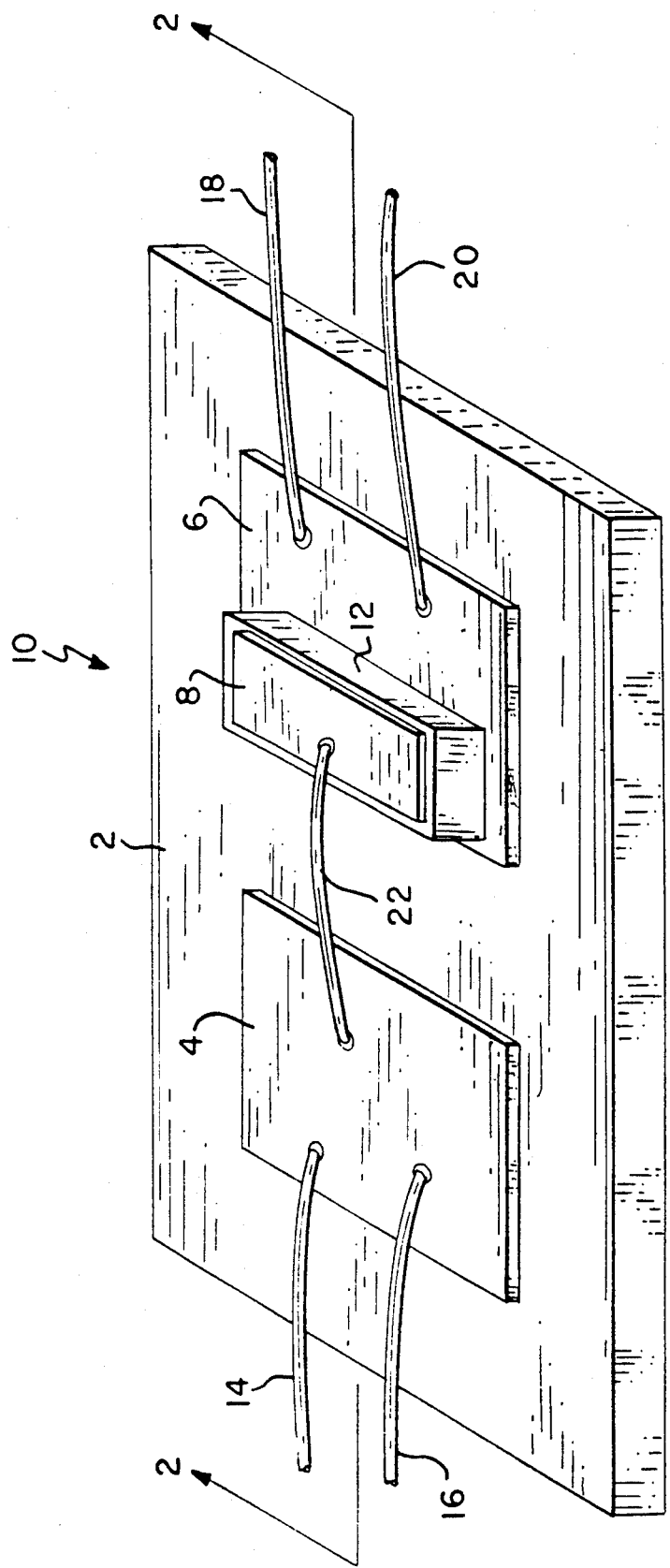
FIG. 1 is a perspective view of a sub-kelvin resistance thermometer according to the present inventive concepts.
Figure 2:
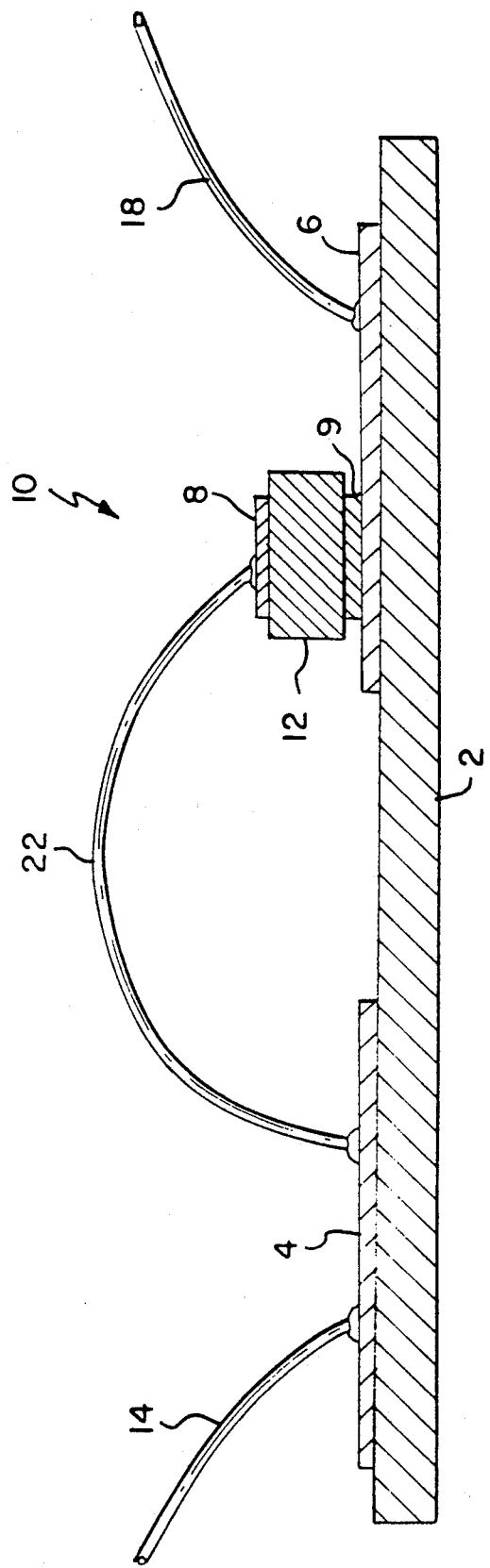
FIG. 2 is a cross-sectional view along line 2—2 of a sub-kelvin resistance thermometer according to the present inventive concepts.

Referring now to FIG. 1, a Sub-Kelvin Resistance Thermometer 10 according to the present inventive concepts is shown perspectively. An oblong bulk doped germanium crystal 12, preferably having a total resistance between 100 Ohms and 100,000 Ohms in the temperature range of interest, is used to facilitate the temperature measurement of an object (not shown) whose temperature is to be measured. Germanium crystal 12 is treated to provide large electrical pads on the top and bottom of the crystal. Top electrical pad 8 covers or nearly covers the entire top surface of crystal 12 and is preferably a gold pad which can be deposited on the top of crystal 12 by sputtering or by other known methods and bottom electrical pad 9 (shown in FIG. 2) also covers or nearly covers the bottom of crystal 12 and is preferably a gold pad deposited on the bottom of crystal 12. The bottom electrical pad on crystal 12 is also physically and electrically connected to wafer electrical pad 6, which is affixed near one end of wafer 2 and is preferably a gold pad deposited on the top of sapphire crystal wafer 2 which acts as a heat sink in the present inventive thermometer 10. If desired, sapphire crystal wafer 2 can be bonded to a mounting plate (not shown) made from copper or other suitable material for mounting thermometer 10 on the object whose temperature is to be measured. Two electrical leads, current lead 18 and voltage lead 20, are bonded to and emanate from wafer electrical pad 6, are used to apply current through and voltage across crystal 12, and are connected to external instruments in the normal manner to enable the temperature measurement of the object whose temperature is to be measured. A second wafer electrical pad 4 is affixed near the opposite end of sapphire crystal wafer 2 for bonding a second pair of matching electrical leads, current lead 14 and voltage lead 16. Electrical lead 22, bonded to wafer pad 4 and top electrical pad 8, provides a connection between wafer pad 4 and top electrical pad 8. Wafer electrical pads 4 and 6 are bonded to or deposited on sapphire crystal wafer in a standard manner, and leads 14, 16, 18, 20 and 22 are bonded to pads 4, 6 and 8 in a standard manner. Examples of bonding are soldering, indium "bump" or silver epoxy and of depositing are sputtering; these techniques are well known in this art.

Other variations of the above are also possible. For example, instead of using a germanium crystal to sense the temperature, an appropriately doped silicon or gallium arsenide crystal could be used. Also, instead of using a germanium crystal with a total resistance between 100 and 100,000 Ohms with direct detection of the resistance, a cold amplifier (JFET) could be used with a crystal that has much higher resistance (up to 10-100 Megohms) in the temperature range of interest.

Instead of using a sapphire crystal for a heat sink, another low expansion coefficient material could be used. Examples include a wafer of silicon or similar crystal, or a metal with an expansion coefficient similar to sapphire. The metal would then be electrically isolated from the germanium crystal or be electrically isolated from its surroundings.

Several different methods can be used to thermally anchor sapphire crystal wafer 2 to the object whose temperature is being measured. If the object whose temperature is being measured has an adequately large and flat surface, sapphire crystal wafer 2 can be attached directly to the object whose temperature is being measured. If the object whose temperature is being measured has no flat surface, sapphire crystal wafer 2 can be mounted to a small copper or gold plate that can then be attached to the object whose temperature is being measured by bolts, screws, silver epoxy or low temperature solder. Another potential method to thermally anchor sapphire crystal wafer 2 is by thermally heat sinking the electrical leads from sapphire crystal wafer 2 to the object whose temperature is being measured.

The advantages of the present invention over the prior art are significant. The present invention uses a bulk doped germanium crystal and therefore has few processing steps. It will, therefore, be much less expensive to fabricate and will be more robust. The invention also incorporates design features to prevent induced strain in the temperature sensing element. Induced strain would prevent the sensor from having a reproducible resistance-temperature calibration.

Figure 3:
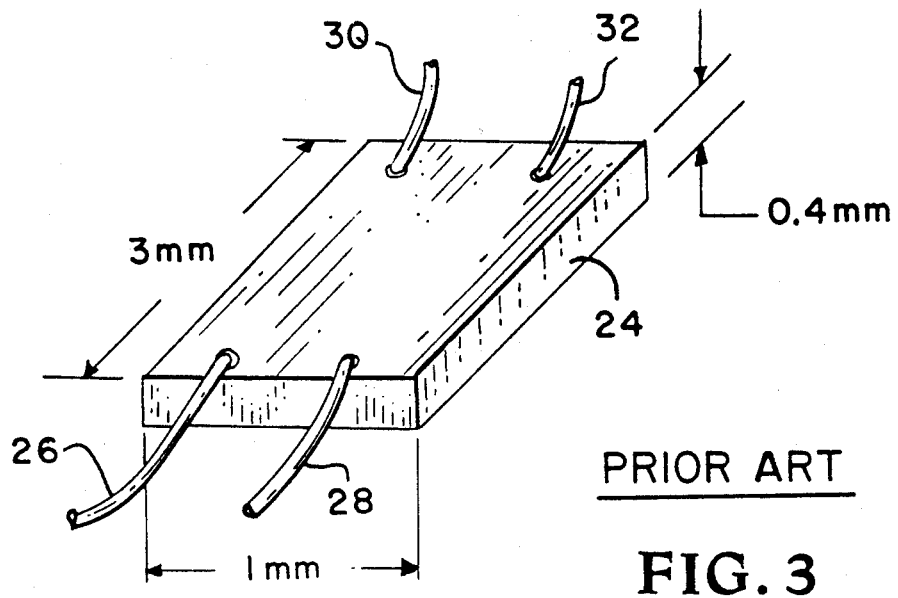
FIG. 3 is a perspective view of a typical prior art doped semiconductor crystal.

The present invention is specifically designed to provide a doped semiconductor region which has a large "A/L", where A is the cross-sectional area perpendicular to the flow of electrons and/or holes in the semiconductor and L is the length of the conducting region. This allows the use of a lower amount of doping which produces a larger relative slope of the temperature/resistance curve $(1/R \times dR/dT)$ at a particular temperature which, in turn, produces a more sensitive temperature sensor. Standard GRT's have precisely the opposite configuration of A/L. A typical commercially available prior art germanium crystal 24, shown in FIG. 3, has dimensions of approximately 3 mm × 1 mm × 0.4 mm. Leads 26 and 30 are the current leads bonded to the top surface of GRT 24 and leads 28 and 32 are the voltage leads, which are also bonded to the top surface of GRT 24. The electrical area to length ratio, A/L, of the prior art crystal, in the commercial configuration, is then approximately:

$$(1 \text{ mm} \times 0.4 \text{ mm})/3 \text{ mm} = 0.13 \text{ mm}$$

Figure 4:
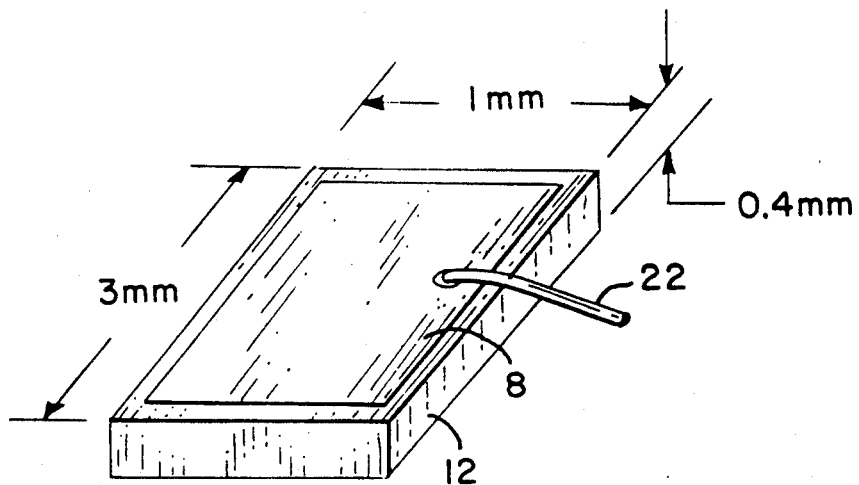
FIG. 4 is a perspective view of a doped semiconductor crystal used in the present invention.

Referring now to FIG. 4, the electrical A/L of the same size germanium crystal 12 of the present invention is approximately:

$$(1 \text{ mm} \times 3 \text{ mm})/0.4 \text{ mm} = 7.5 \text{ mm}$$

Thus, if the same size germanium crystal is used in both applications, the electrical resistance measured in the present invention will be reduced by a factor of 58.

The resistance at low temperatures is given approximately by:

$$\ln(R) = \text{constant} \times \exp(T^{-\frac{1}{2}})$$

Figure 5:
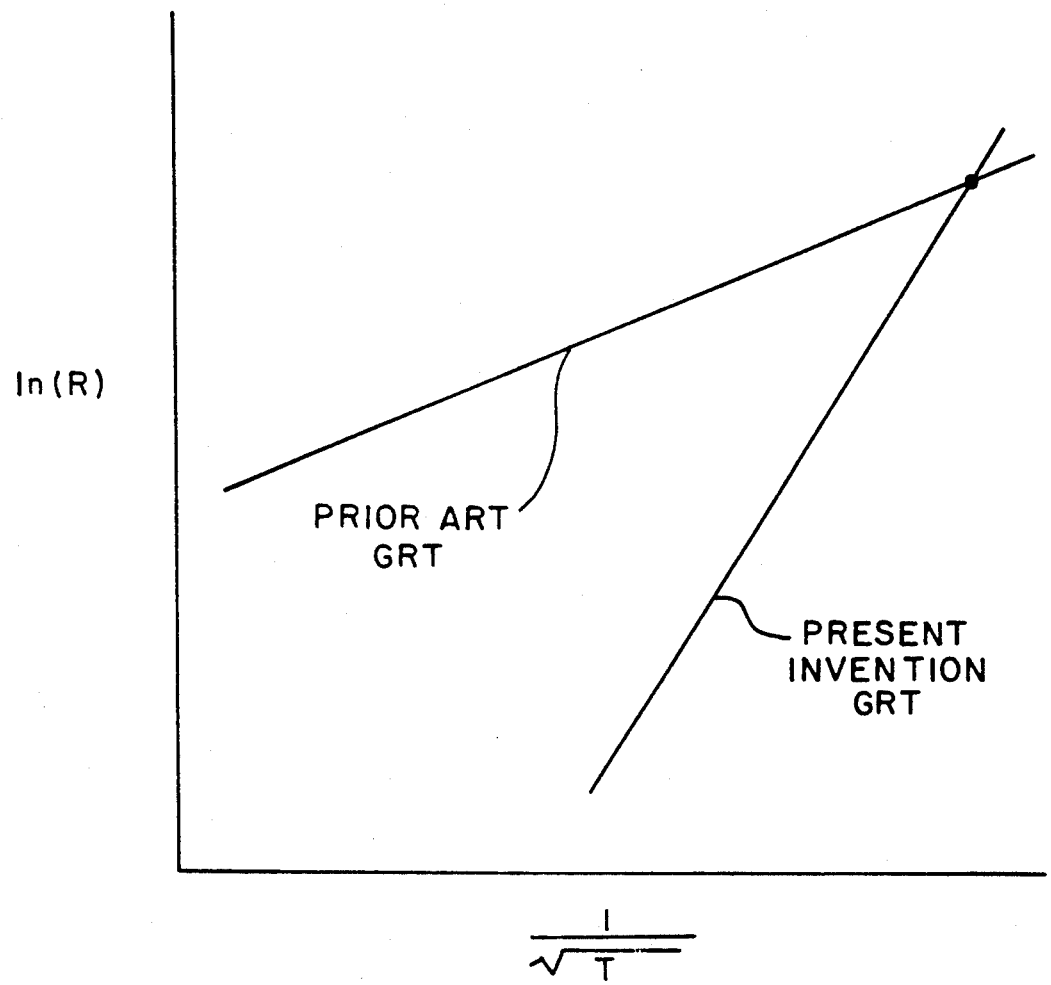
FIG. 5 is a graph of the response of a prior art thermometer and the present inventive thermometer.

Assume two germanium crystals, each with an R vs. T curve such that the resistance at some temperature is the same as the resistance of the other crystal when one is mounted in the prior art way and the other is mounted as in the present invention. These germanium crystals will have slopes $(1/R \times dR/dT)$ that differ by a factor of 4.3 at the temperature that the germanium crystal have the same resistance. This is shown in FIG. 5. The greater slope of the present inventive temperature sensor will increase the sensitivity of the temperature measurement by a factor of 4.3.

The large A/L and resulting low doping levels and low electric fields in the crystal results in the resistance/temperature curve being more similar to the resistance/temperature curve of a bolometer (resistance, R, proportional to the natural exponent of the square root of the inverse of the temperature, T). This functional form of R and T allows one to calibrate the resistance thermometer with fewer data points. The cost savings resulting from the ease of calibration can be large relative to the entire cost of producing the present inventive temperature sensor. Also, the calibration will be more precise.

The present invention thus provides a doped semiconductor region for sensing temperature which has a physically large surface area, a surface area that is in good thermal contact with the heat sink, and a high thermal conductivity heat sink wafer. This configuration allows the efficient removal of the heat dissipated in the semiconductor temperature sensor and, therefore, allows the use of a larger current to measure the resistance which, in turn, produces a more sensitive temperature sensor. The nearest prior art sensor has a physically small temperature sensing region which will limit the heat conduction out of the temperature sensing region.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A device used in accurate temperature measurement of an object comprising:
   a heat sink wafer;
   a first conducting pad near one end of said heat sink wafer and a second conducting pad near the other end of said heat sink wafer;
   an oblong doped semiconductor crystal;
   said oblong doped semiconductor crystal having a third conducting pad covering or nearly covering its top surface and a fourth conducting pad covering or nearly covering its bottom surface;
   said oblong doped semiconductor crystal affixed to said heat sink wafer by having said fourth conducting pad affixed to said first conducting pad;
   conducting means between said second and third conducting pads; and
   current and voltage applying means communicating with said first and second conducting pads whereby the change in resistance of said oblong doped semiconductor crystal is used to facilitate the temperature measurement of said object.

2. The device of claim 1 wherein said oblong doped semiconductor crystal comprises a germanium crystal.

3. The device of claim 2 wherein said germanium crystal has a resistance between 100 ohms and 100,000 ohms at a temperature between 0.01° K. and 1° K.

4. The device of claim 1 wherein said oblong doped semiconductor crystal comprises a silicon crystal.

5. The device of claim 1 wherein said oblong doped semiconductor crystal comprises a gallium arsenide crystal.

6. The device of claim 1 wherein said heat sink wafer comprises a sapphire crystal.

7. The device of claim 1 wherein said heat sink wafer comprises a silicon crystal.

8. The device of claim 1 wherein said heat sink wafer comprises a metallic object having an expansion coefficient approximating that of sapphire.

9. The device of claim 1 wherein said first, second, third and fourth conducting pads are gold conducting pads.

10. The device of claim 9 wherein said gold conducting pads are affixed by sputtering.

11. The device of claim 1 wherein said conducting means between said second and third conducting pads comprises a wire bonded to said second and third conducting pads.

12. The device of claim 1 wherein said current and voltage applying means communicating with said first and second conducting pads comprises a first pair of wires bonded to and emanating from said first conducting pad and a second pair of wires bonded to and emanating from said second conducting pad.

* * * * *